United States Patent [19]
Toda

[11] Patent Number: 5,386,717
[45] Date of Patent: Feb. 7, 1995

[54] GAS LEAKAGE TESTING METHOD

[75] Inventor: Hiromitsu Toda, Hamamatsu, Japan

[73] Assignee: Yamaha Corporation, Hamamatsu, Japan

[21] Appl. No.: 118,011

[22] Filed: Sep. 8, 1993

Related U.S. Application Data

[63] Continuation-in-part of Ser. No. 830,835, Feb. 4, 1992, abandoned.

[30] Foreign Application Priority Data

Feb. 8, 1991 [JP] Japan .................................. 3-039350

[51] Int. Cl.6 .............................................. G01M 3/20
[52] U.S. Cl. ................................................. 73/40.7
[58] Field of Search ................................. 73/40.7, 49.2

[56] References Cited

U.S. PATENT DOCUMENTS

| | | | |
|---|---|---|---|
| 3,186,214 | 6/1965 | Roberts | 73/40.7 |
| 3,762,212 | 10/1973 | Morley et al. | 73/40.7 |
| 4,257,439 | 3/1981 | Mayeaux | 73/16 |
| 4,754,638 | 7/1988 | Brayman et al. | 73/40.7 |
| 5,214,412 | 5/1993 | Gavlak et al. | 73/23.21 |

*Primary Examiner*—Hezron E. Williams
*Assistant Examiner*—Michael J. Brock
*Attorney, Agent, or Firm*—Spensley Horn Jubas & Lubitz

[57] ABSTRACT

A gas leakage testing method to be applied to a gas leakage testing system is provided to effectively detect whether or not any leakage points exist in a testing specimen. In a gas leakage test, the testing specimen is stored in a testing container in an air tight manner, and then, a leakage detector searches the leakage point in the testing specimen by use of probe gas (i.e., helium gas). However, due to the existence of the probe gas component in the atmospheric air, a background noise occurs, and it deteriorates the detection precision of the leakage detector. In order to avoid such drawback, a vacuum evacuation is carried out so as to reduce an internal pressure of the testing container to a predetermined low pressure (preferably, ranging from 500 hPa to 1 hPa), and then, the testing container is purged with substitute gas (e.g., nitrogen gas). The above-mentioned vacuum evacuation process and gas substitution process are repeatedly carried out by a predetermined number of times which depends on the above predetermined low pressure. Thereafter, density of the probe gas existing in the testing container is detected so as to obtain a background value representing the background noise. Then, the probe gas is introduced into the testing specimen, and the density of the probe gas in the testing container is detected again so as to determine whether or not the probe gas has leaked from the testing specimen on the basis of the background value.

5 Claims, 8 Drawing Sheets

| INTERNAL PRESSURE OF TESTING CONTAINER | 800 hPa | 500 hPa | 10 hPa | 1 hPa | 0.01 hPa |
|---|---|---|---|---|---|
| NUMBER OF TIMES BY WHICH PURGING OPERATION IS CARRIED OUT | 6~7 TIMES | 3 TIMES | 3 TIMES | 2 TIMES | 1~2 TIMES |

FIG.10

GAS LEAKAGE TESTING METHOD

This application is a continuation-in-part of Ser. No. 07/830,835 filed Feb. 4, 1992, now abandoned.

BACKGROUND OF THE INVENTION

1. Field of the Invention

The present invention relates to a gas leakage testing method which is used to detect a gas micro-leakage from a testing specimen in a gas leakage test.

2. Prior Art

Conventionally, there are provided several kinds of gas leakage testing methods and devices as shown in FIGS. 1 to 5.

FIG. 1 shows one of the conventional gas leakage testing devices which is designed according to the so-called vacuum method (i.e., the testing method in which probe gas is blown toward the testing specimen). Herein, a leakage detector 2 is connected to a testing specimen 1 such that gas can be flown between them. In addition, a suction pump 3 is connected to the testing specimen 1 so that the interior wall of the testing specimen 1 is subjected to evacuation. Further, there is provided a helium gas bomb which blows out helium gas (i.e., He gas) toward the outer wall of the testing specimen from its He-gas blowing pipe 5.

After subjecting the testing specimen to evacuation by use of the vacuum pump 3, this device interconnects the leakage detector 2 to the inside of the testing specimen, so that He gas is blown toward the testing specimen 1 via the blowing pipe 5. If a leakage point exists in the wall of the testing specimen 1, He gas must be introduced into the testing specimen 1 from such point, which is detected by the leakage detector 2.

FIG. 2 shows another device according to another vacuum method (i.e., hood-type testing method which also blows the probe gas toward the testing specimen). Herein, in a manner similar to the foregoing device shown in FIG. 1, the testing specimen 1 can be selectively connected to one of the leakage detector 2 and suction pump 3. Further, this testing specimen 1 is covered by a container such as a hood 6.

In this device, the vacuum pump 3 subjects the testing specimen 1 to evacuation, and then helium gas is filled in the hood 6. In this state, if a leakage point exists in the testing specimen 1, He gas is introduced into the leakage detector 2 via this point, so that the leakage detector 2 will detect He-gas leakage. According to this device, it is possible to detect the gas leakage in the whole portion of the testing specimen 1, by which gas leakage quantity can be measured as a whole.

FIG. 3 shows a gas leakage testing device according to the vacuum internal-pressure method. Herein, the testing specimen 1 which is filled with He gas in advance is inserted into a chamber 7, and then the vacuum pump 3 subjects this chamber 7 to evacuation. In this state, if a leakage point exists in the testing specimen 1, He gas must be leaking from this point, which is detected by the leakage detector 2.

FIG. 4 shows a gas leakage testing device according to the sniffer method. Herein, the testing specimen 1 which is filled with pressurized He gas is inserted into the chamber 7, and then the vacuum pump 3 subjects the chamber 7 to evacuation. In addition, a sniffer probe 9 sniffs around the testing specimen 1, and consequently, He gas leaking from the leakage point of the testing specimen 1 is detected by the leakage detector 2.

FIG. 5 shows a gas leakage testing device according to the integration method. Herein, the testing specimen 1 which is filled with pressurized He gas is inserted into a hood 8 the capacity of which is known. After the vacuum pump 3 subjects the hood 8 to evacuation, the testing specimen 1 is left as it is for a long time. In such period of time, this device measures variation of helium density in He gas to be leaked from the testing specimen 1. By integrating such variation of helium density, it is possible to detect a micro-leakage quantity.

Regardless of the above-mentioned features, each of the conventional gas leakage testing devices suffers from the following drawbacks.

In the devices as shown in FIGS. 1, 2, after subjecting the testing specimen 1 to evacuation, He gas is filled around the testing specimen 1, so that gas leakage is detected by detecting He gas to be introduced into the specimen 1. On the other hand, in the devices as shown in FIGS. 3 to 5, after filling the testing specimen 1 with pressurized He gas, gas leakage is detected by detecting He gas to be leaked to the outside of the specimen 1. As described above, the conventional devices subject the inside or outside (i.e., inside of the chamber) of the testing specimen 1 to vacuum evacuation. However, due to the existence of natural He gas (at 5 volppm) in the air, it is hard for the leakage detector to correctly detect the gas micro-leakage.

In order to detect such gas micro-leakage with accuracy, evacuation must be made to the highly vacuumed state, which makes the testing time longer. In addition, such highly vacuumed state may require more than two kinds of pumps to be coupled together, which makes the evacuation system more complicated.

When examining large number of testing specimens, vacuum evacuation must be made in a relatively short period of time. For this reason, it is necessary to provide a large-scale vacuum evacuation device, however, which raises the whole system cost higher.

Even if such large-scale vacuum evacuation device is used, volatile matter or water content may be produced from the testing specimen or wall of a testing container, and gas or air may be ejected from micro-holes of the testing specimen. Thus, it is hard to raise the degree of vacuum in a short period of time. In addition, He gas existing in the air may work as the background noise for the detector. These factors make the detecting precision for leaked He gas lower.

SUMMARY OF THE INVENTION

Accordingly, it is an object of the present invention to provide a gas leakage testing method by which the detecting precision for the gas leakage is not affected by the background noise caused by the probe gas under a low degree of vacuum so that the gas micro-leakage can be detected with accuracy and at high speed.

The gas leakage testing method according to the present invention is applied to a gas leakage testing system comprising: a testing container which can store a testing specimen in an air-tight manner; an evacuation device which can remove air or gas from the testing container; a probe gas introducing device which can introduce probe gas into the interior of the testing specimen; a probe gas detecting device, interconnected with the testing container, which detects probe gas in the testing container; and a substitute gas supplying device which can supply substitute gas into the testing container. Furthermore, it is possible to provide another evacuation device which can remove air or gas from the interior of the testing specimen.

A method of testing gas leakage basically comprises the steps of: storing a testing specimen in a testing container; replacing the air in the testing container with substitute gas; detecting the density of probe gas existing in the testing container so as to obtain a background value; introducing probe gas into the testing specimen; detecting the density of the probe gas in the testing container so as to determine whether or not the probe gas is leaking from the testing specimen on the basis of the background value.

In the aforementioned system, after storing the testing specimen within the testing container, the substitute gas supplying device supplies substitute gas into the testing container, so that the inside air or inside gas is replaced by substitute gas. Then, the evacuation device removes air or gas from the testing container, so that the density of probe gas is lowered in the testing container. Thereafter, the probe gas detecting device detects the density of probe gas in the testing container, thereby computing a background value. After that, the probe gas introducing device introduces probe gas into the interior of the testing specimen. In this state, if there exists a leakage point in the testing specimen, probe gas is leaked to the outside space of the testing specimen in the testing container, which is detected by the probe gas detecting device. Thus, if the density value of probe gas to be detected by the detecting device becomes higher than the background value, it is proved that one or more leakage points must exist in the testing specimen.

Incidentally, as the method of gas substitution of the testing container made by the substitute gas supplying device, there are provided three methods. More specifically, in the first method, gas substitution is made under atmospheric pressure; in the second method, the gas substitution is made after completely removing the air or gas from the testing container; and in the third method, the gas substitution is made after removing the air or gas from the testing container to a certain degree. Further, the present invention can employ another method wherein the air in the testing container is diluted with the substitute gas. Herein, in order to lower the background value and also improve the gas leakage detecting precision, it is preferable for the present invention to employ the method in which the substitute gas is introduced into the testing container after removing the air or gas from the testing container.

As described before, introduction of the probe gas into the testing specimen is made under the state where the air exists in the testing specimen. Or, it is possible to introduce probe gas into the testing specimen after subjecting the interior of the testing specimen to evacuation by the evacuation device. In order to improve the gas leakage detecting precision, it is preferable to introduce probe gas after subjecting the interior of the testing specimen to evacuation.

As the probe gas, it is possible to employ freon gas, hydrogen gas, helium gas etc. As the substitute gas, it is Possible to employ nitrogen gas, oxygen gas, steam, freon gas etc. In this case, however, the substitute gas must not contain the component of the probe gas. In other words, the substitute gas must not contain the component of the probe gas the volume of which is larger than that of the air at least. More specifically, the volume of the probe gas is less than one-tenth the volume of the air. Therefore, when using the freon gas as the probe gas, the freon gas cannot be used as the substitute gas.

As for the gas to be introduced into the testing container and testing specimen, it is possible to reversely use one of the probe gas and substitute gas. In other words, the probe gas can be introduced into the testing container, while the substitute gas can be introduced into the testing specimen. In addition, several modifications can be made in the usage of the gas to be introduced. In this case, for example, the probe gas detecting device may be interconnected with the testing specimen.

BRIEF DESCRIPTION OF THE DRAWINGS

Further objects and advantages of the present invention will be apparent from the following description, reference being had to the accompanying drawings wherein the preferred embodiment of the present invention is clearly shown.

In the drawings:

FIG. 10 is a drawing showing a relationship between an internal pressure of the testing container and a number of times by which a purging operation is repeatedly carried out.

DESCRIPTION OF THE PREFERRED EMBODIMENT

Next, the description will be given with respect to a gas leakage testing method according to an embodiment of the present invention. Before describing the gas leakage testing method in detail, the description will be given with respect to a system configuration of a gas leakage testing system to which the gas leakage testing method is applied.

[A] System Configuration

Figure 6:
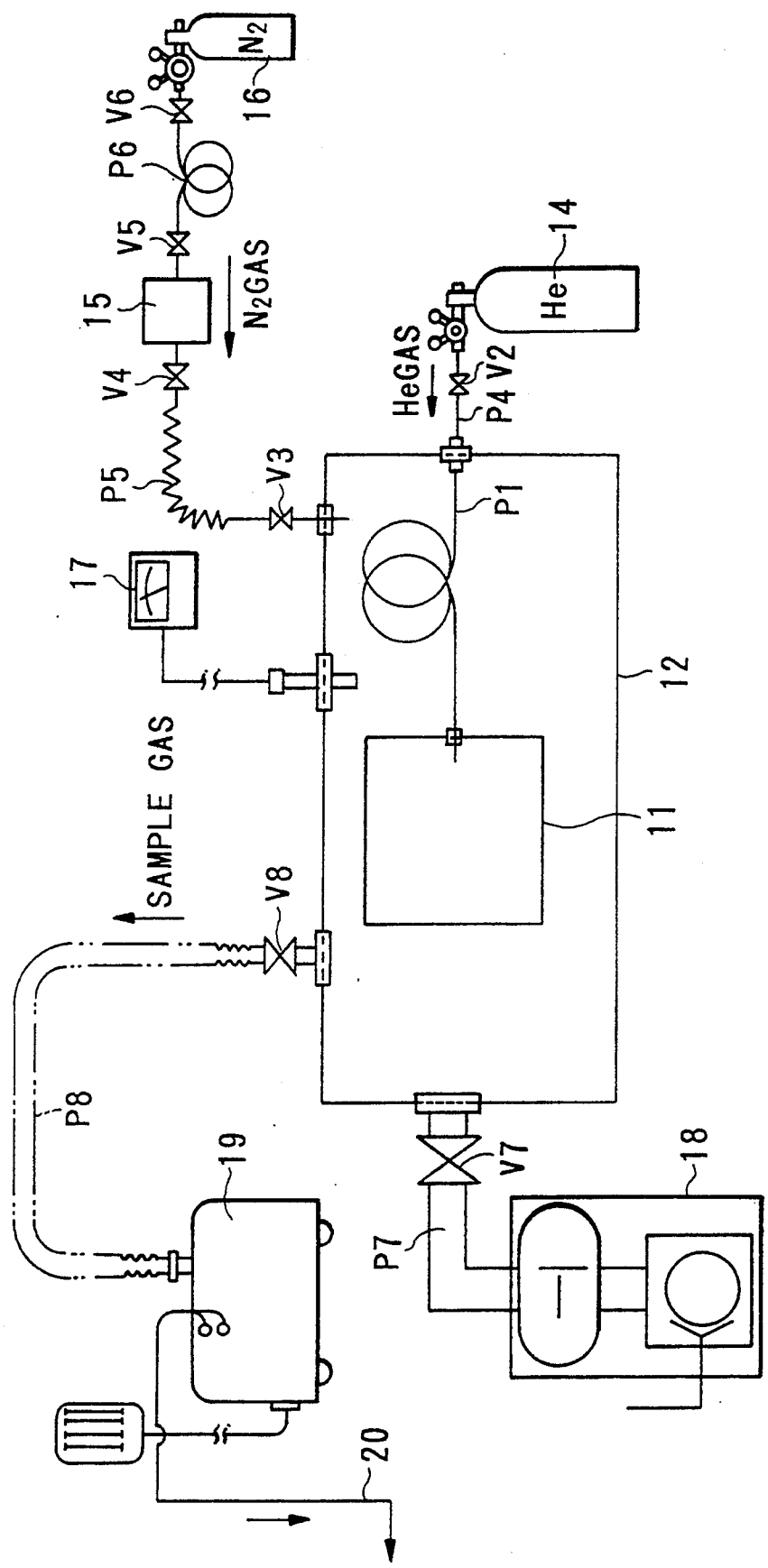
FIG. 6 is a schematic drawing illustrating a system configuration of a gas leakage testing system to which a gas leakage testing method according to the present invention can be applied.

FIG. 6 is a schematic drawing illustrating an example of the gas leakage testing system. In FIG. 6, a vacuum container 12 has a size such that a testing specimen 11 can be stored therein in an air tight manner. Herein, the interior of this testing specimen 11 is interconnected with a copper pipe P1 having a diameter of ¼ inch, for example. This copper pipe P1 extends to the outside of the vacuum container 12 in an air tight manner, and it is further connected to a bomb 14, storing helium gas which is used as the probe gas, through another pipe P4. In addition, an open/close valve V2 is provided at the middle of the pipe P4.

Another pipe P5 connects the vacuum container 12 with a reserve tank 15 which is capable of storing nitrogen gas (i.e., $N_2$ gas) used as the substitute gas. This reserve tank 15 is further connected to a $N_2$ gas bomb 16 through a pipe P6. Herein, a vent valve V3 and an open/close valve V4 are provided on the pipe P5, while open/close valves V5, V6 are provided on the pipe P6.

Meanwhile, the vacuum container 12 is connected with a vacuum evacuation unit 18 through a pipe P7. In addition, this vacuum container 12 is also connected with a leakage detector 19 through a pipe P8. This leakage detector 19 is designed to detect the probe gas and then convert it into an electric signal, i.e., a detection signal, which is outputted to a leakage judging unit (not shown) by means of wires 20.

In the above-mentioned gas leakage testing system, the testing specimen 11 is inserted into the vacuum container 12, and the pipe P1 is interconnected with the testing specimen 11. After that, the vacuum evacuation unit 18 is driven so as to open the valve V7 and remove the air from the container 12. After the internal pressure of the vacuum container 12 is reduced to a certain pressure approximately ranging from 10 Torr (i.e., $1.33 \times 10^3$ Pa) to 1 Torr (i.e., $1.33 \times 10^2$ Pa), the valve V3 is opened so that $N_2$ gas is supplied to the vacuum container 12 from the bomb 16 by means of the reserve tank 15. In order to normally fill the reserve tank 15 with $N_2$ gas, the valves V5 and V6 are normally opened. Herein, the valve V4 is provided to adjust the gas flow, therefore, it is normally opened at a certain valve-opening degree which is larger than the minimum valve-opening degree. Incidentally, the gas flow control for $N_2$ gas can be made by either one of the valves V3 and V4. After $N_2$ gas is introduced so that the internal pressure of the vacuum container 12 reaches 50 Torr (i.e., $6.65 \times 10^3$ Pa) approximately, the valve V3 is closed. The open/close timings of the valves depend on the internal pressure of the vacuum container 12 which corresponds to the detection precision of He gas.

By closing the valve V3, the air in the vacuum container 12 is intermittently evacuated by the vacuum evacuation unit 18, and consequently, the internal pressure of the vacuum container 12 is reduced. When this internal pressure of the vacuum container 12 is reduced to the predetermined pressure (e.g., 0.75 Torr, i.e., approximately 100 Pa) at which the tie leakage detector 19 can operate, the valve V8 is opened. Next, the valve V7 is closed, so that the leakage detector 19 will detect the density of He gas in the vacuum container 12. Herein, the detected density of He gas is converted into the background value, of which data is sent to the leakage judging unit. When measuring the background value, it is possible not to close the valve V7 and to continue the evacuation of the vacuum container 12.

Next, the valve V2 is opened so as to introduce He gas into the testing specimen 11. In this case, if a leakage point exists in the wall of the testing specimen 11, He gas must be ejected from the testing specimen 11 through such leakage point, and consequently, it must be leaked to the space of the vacuum container 12. Then, the leakage detector 19 detects the density of He gas within the vacuum container 12. The detection signal is supplied to the leakage Judging unit by means of the wires 20, wherein the value thereof is compared to the foregoing background value. If the detection value which is obtained after He gas is introduced into the vacuum container 12 is higher than the background value, it is judged that the gas leakage has occurred in the testing specimen 11.

In the aforementioned example of the system, after the gas substitution (or gas dilution) is carried out in the vacuum container 12 by use of $N_2$ gas and the vacuum container 12 is subjected to evacuation, He gas is introduced into the testing specimen as the probe gas. Therefore, as compared to the conventional devices, the present embodiment can reduce the background value of He gas. In such background-value-reduced state, the present system detects He gas leaked from the testing specimen. Therefore, even if the gas leakage quantity is extremely small, the present system can certainly detect the gas leakage. In addition, even when the highly vacuumed state cannot be obtained so that the vacuum evacuation can be made to a relatively low degree of vacuum, it is possible to detect He gas leaked from the testing specimen. Therefore, the capacity of the vacuum pump or vacuum evacuation unit 18 can be reduced. Thus, the present system can carry out a gas leakage test in a short period of time, by use of the simple evacuation unit.

Figure 7:
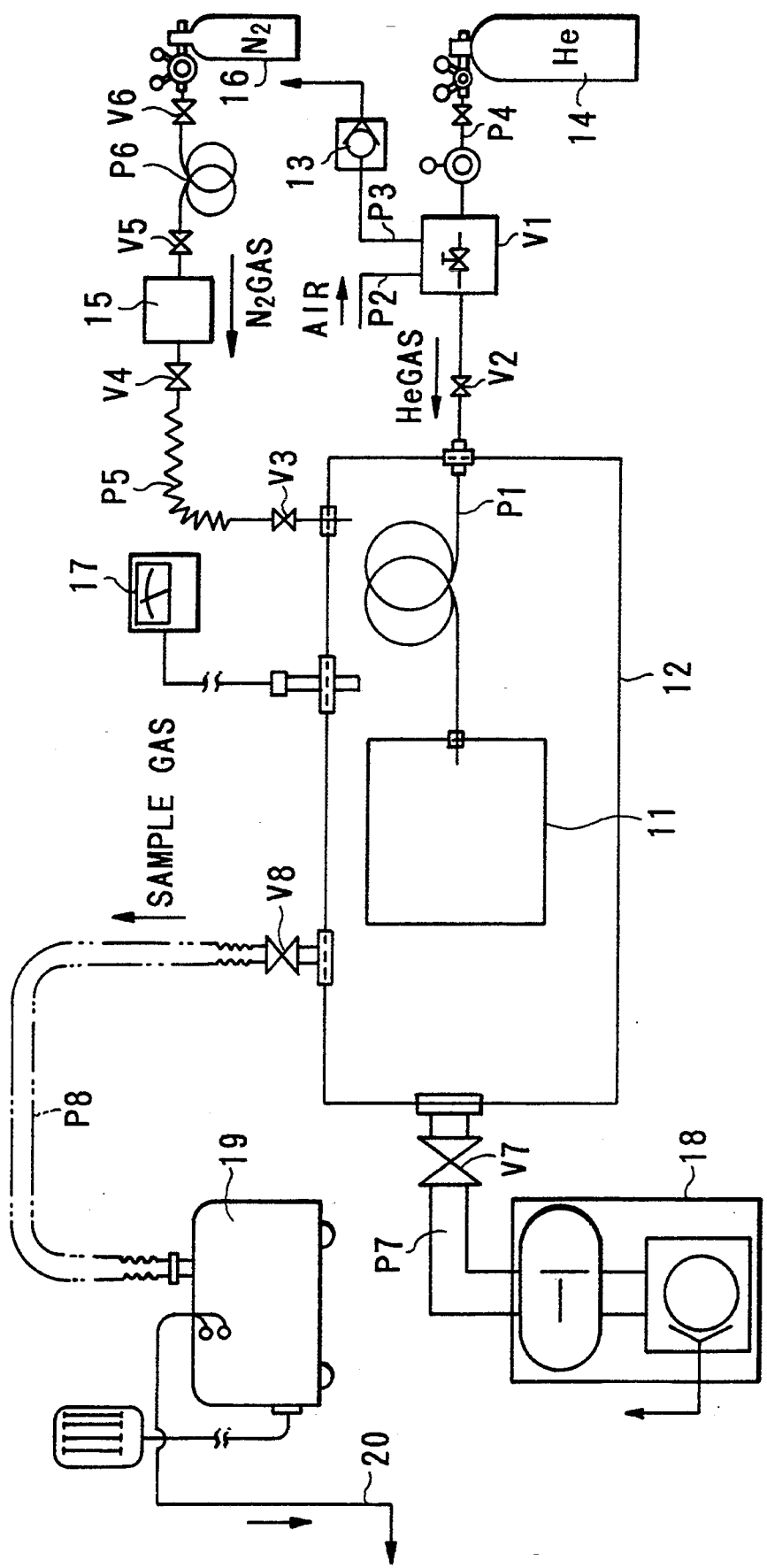
FIG. 7 is a schematic drawing illustrating a system configuration of another gas leakage testing system.

FIG. 7 is a schematic drawing illustrating another example of the gas leakage testing system, wherein parts identical to those shown in FIG. 6 will be designated by the same numerals; hence, description thereof will be omitted. Herein, a main difference between these two systems lies in the provision of a valve network V1 to be provided between the pipes P1 and P4. This valve network V1 is connected with pipes P2 and P3, wherein the pipe P2 is provided to introduce the air, while another pipe P3 is further connected with a pump 13.

In the above-mentioned example of the system, the testing specimen 11 is inserted into the vacuum container 12, and then, the testing specimen 11 is interconnected with the pipe P1. After that, the valve network V1 is changed over to drive the pump 13, while the valve V2 is opened to remove the air from the testing specimen 11. Next, the vacuum evacuation unit 18 is driven, and the valve V7 is opened, so that the vacuum container 12 is subjected to evacuation. Thereafter, in a similar fashion to the foregoing example of the gas leakage testing system, the inside gas of the vacuum container 12 is replaced with the substitute gas and the vacuum container 12 is again subjected to evacuation to thereby reduce the density of the probe gas existing in the vacuum container 12, and then, the background value is measured.

Next, the valve network V1 is changed over such that the pipe P1 is connected to the pipe P2, and the valve V2 is opened so as to introduce He gas into the testing specimen 11. Thereafter, the leakage detector 19 detects the density of He gas in the vacuum container 12, and a result of the detection is compared to the background value. If the detection value which is obtained after introducing He gas is higher than the background value, it is Judged that one or more leakage points must exist in the testing specimen 11.

The above example of the system is designed such that after subjecting the testing specimen 11 to evacuation, the probe gas (i.e., He gas) is introduced into the testing specimen 11. Therefore, this system can further improve the leakage detection precision.

Figure 8:
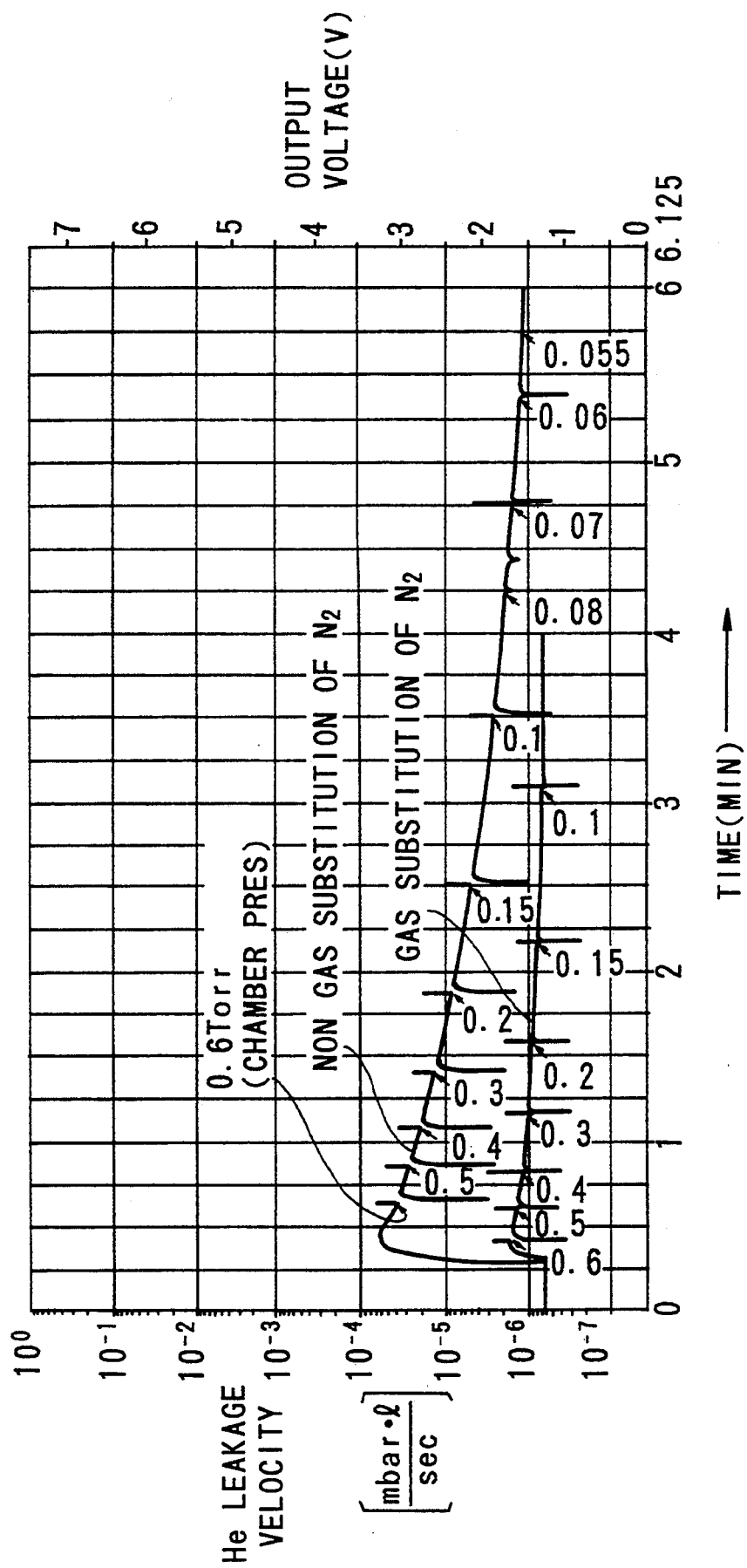
FIG. 8 is a graph showing a variation of gas leakage velocity of He gas with respect to the gas substitution using $N_2$ gas.

Next, the description will be given with respect to advantages of the present system in the actual gas leakage test. FIG. 8 is a graph showing a density variation of He gas in an evacuation process, wherein the horizontal axis represents time, while the vertical axis represents gas leakage velocity of He gas (which corresponds to the detection voltage of the leakage detector). FIG. 8 includes two kinds of curves each representing a variation of leakage velocity, wherein the first curve corresponds to the state where the evacuation is made after carrying out the gas substitution using $N_2$ gas, while the second curve corresponds to the state where the evacuation is made without carrying out the gas substitution using $N_2$ gas. In each curve, the density of He gas becomes lower with lapse of time. However, in the second curve wherein the gas substitution using $N_2$ gas is not carried out, the density of He gas is relatively high and the background value is also relatively high. On the other hand, in the first curve wherein the evacuation is made after carrying out the gas substitution using $N_2$ gas, the detected density of He gas must be lower, and the background value becomes remarkably low.

Figure 1:
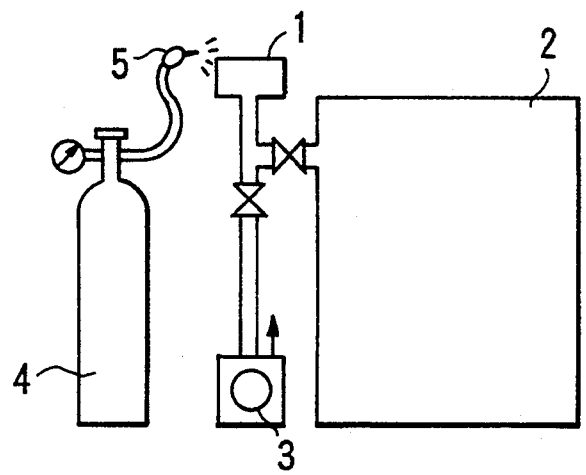
FIGS. 1 to 5 are schematic drawings each illustrating a system configuration of the conventional gas leakage testing system.
Figure 2:
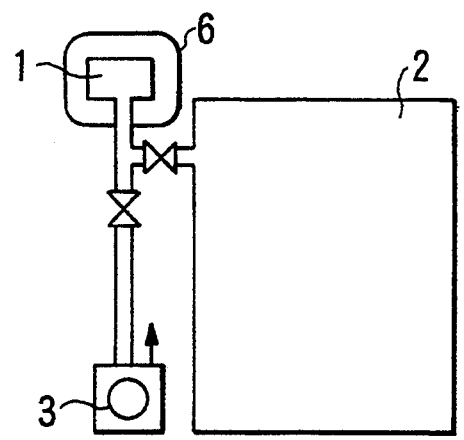
Figure 3:
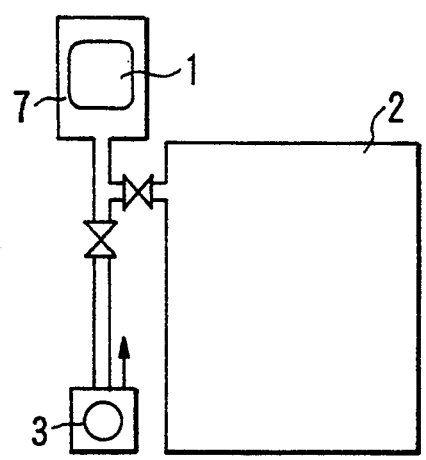
Figure 4:
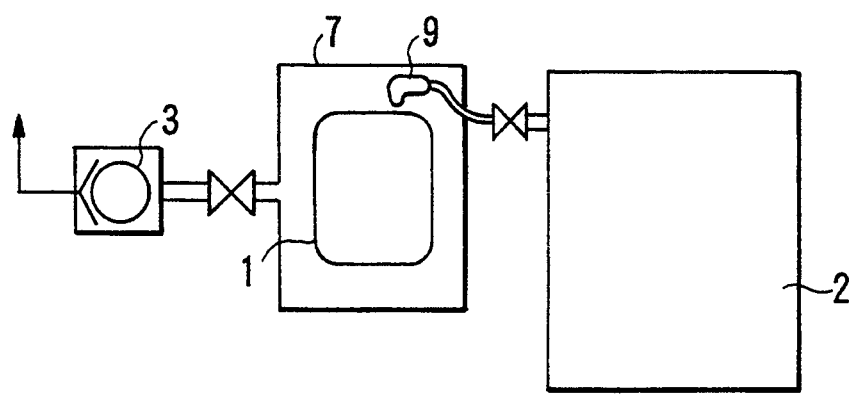
Figure 5:
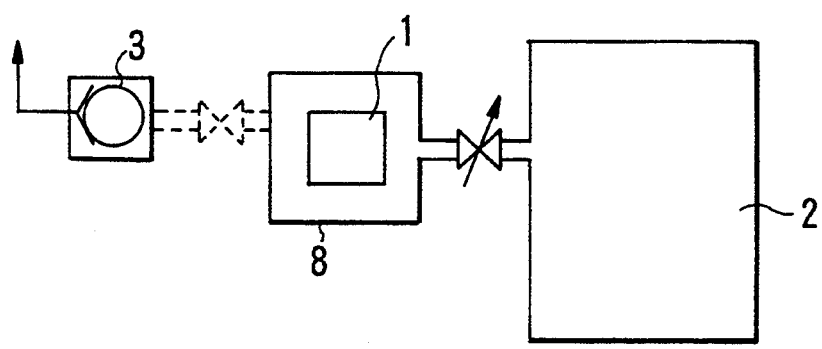
Figure 9:
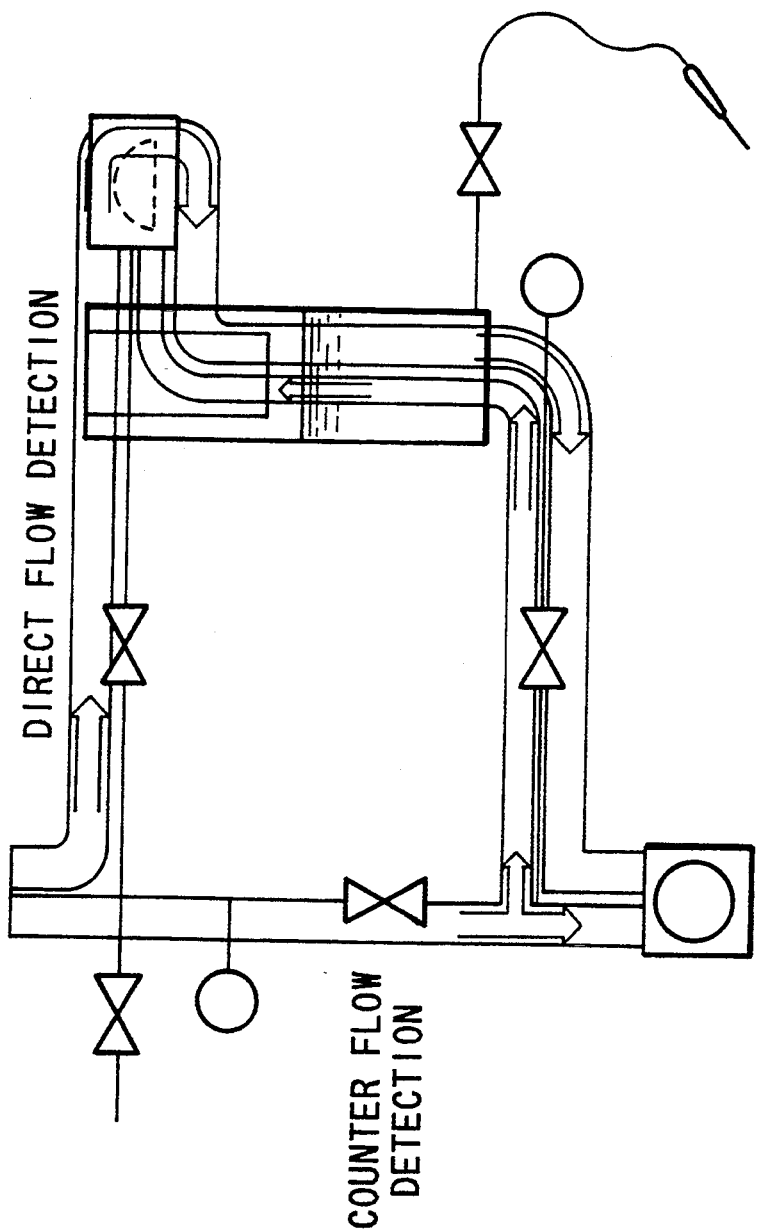
FIG. 9 is a schematic drawing illustrating a construction of a He gas leakage detector using a turbo molecular pump.

As described heretofore, the present system is designed such that after replacing the air in the vacuum container 12 with $N_2$ gas, the gas leakage of He gas is detected in a state where the vacuum container 12 is evacuated to a relatively low degree of vacuum. Therefore, the leakage detector 19 must have a function in which He gas can be detected under a state of a low degree of vacuum. As such device which can detect He gas under a low degree of vacuum, it is possible to employ one of the conventional devices as illustrated in FIGS. 3 to 5. Even in these devices, a leakage valve or a capillary must be provided to increase a gas-flow-resistance and therefore provide a gas-pressure difference. As a method in which He gas can be detected in a highly-responsive and highly-sensitive manner without using the above-mentioned leakage valve or capillary, the modern technology can offer a system as illustrated in FIG. 9. FIG. 9 illustrates a leakage detector which can detect He gas under a low degree of vacuum by using the counter flow of the turbo molecular pump.

As described above, the above-mentioned techniques can detect He gas under a low degree of vacuum. However, due to the existence of He gas at 5 volppm in the atmospheric air, the background value of He gas must be high, so that the gas micro-leakage cannot be detected with accuracy. In order to detect such gas micro-leakage, as described before, the vacuum container must be evacuated to a high degree of vacuum so that the background value of He gas will be reduced. For this reason, the above-mentioned techniques may not be available.

In contrast, the present system is designed such that after replacing the air in the vacuum container 12 with $N_2$ gas, the vacuum container 12 is subjected to evacuation so as to reduce the density of the probe gas existing in the vacuum container 12, and then the gas leakage detection is made by use of He gas as the probe gas. Therefore, the present system can detect the gas leakage under a state where the background value is relatively low. In other words, the present system can effectively use the superior characteristic of the foregoing turbo-molecular-pump-type leakage detector in the detection of the gas micro-leakage.

When testing the mass-production goods, the inspection time must be shortened, which reversely indicates that there is a need in which He gas is measured in a relatively low degree of vacuum. On the other hand, according to the gas-leakage inspection standard (e.g., freon gas regulation in these days), there is a demand in which the gas leakage test is made under a high degree of vacuum. In the conventional techniques, it must be necessary to judge the gas micro-leakage under a state where the background value of He gas is reduced by a high degree of vacuum so as to enlarge S/N ratio.

Meanwhile, the testing specimen 11, in general, will produce much quantity of the volatile matters such as the oil, water content and organic solvent. In many cases, the finished products have been already painted, or they are subjected to resin treatment, or they contain water content like sponges, dust and the like, for example. Thus, in order to achieve the middle or high degree of vacuum, it is necessary to use a high-capacity vacuum pump of which the vacuum evacuation characteristic is improved in a range between the middle and high degrees of vacuum. However, the vacuum pump to be used in such range has a construction weakness against the oil, dust, fibers, small sands and the like to be entered therein. These matters will deteriorate the durability of the pump. The same thing can be said of the leakage detector for He gas. Even in the oil diffusion pump or direct-flow-type turbo pump, the analyzer tube and the like must be in trouble in a short period of time by the pollutant and the like, which is troublesome.

In contrast, the counter-flow-type (i.e., back-diffusion-type) turbo pump has a special construction in which the gas other than He gas and $H_2$ gas cannot be entered into the section other than the highly-vacuumed or super-high-vacuumed sections containing the analyzer tube (i.e., spectrometer). In short, the pollutant or foreign matters are ejected by the main pump (normally, a rotary pump) provided at the discharge side (i.e., follow-line side) of the turbo pump. This remarkably reduces the possibility in that the turbo pump and analyzer tube are in the trouble or malfunction due to the entering of the pollutant and foreign matters.

The present system described before is designed on the basis of the combination of the back-diffusion-type He gas leakage detector and gas substitution/evacuation means. Herein, the leakage detector employs the turbo molecular pump and the like. In the gas substitution/evacuation means, the atmospheric air containing He gas is partially or completely substituted by the gas, such as $N_2$ gas or $O_2$ gas, which does not contain He gas, or organic solvent and the like, and then, the evacuation is carried out. Thereafter, the partial pressure of He gas is reduced. Thus, the present system is available when detecting the gas micro-leakage at high speed and with a simple system.

[B] Gas Leakage Testing Method (1) Points of the present invention

The gas leakage testing method as defined in the present invention is characterized by that He gas is used as the probe gas and a purging process is carried out at a reduced pressure which may range from 500 hPa to 1 hPa. Through experiments and studies for the gas leakage tests, it is observed that by blowing the substitute gas into the testing container at a reduced pressure and then purging the testing container, He gas remained in the testing container can be effectively removed, in other words, the background noise can be effectively eliminated or minimized.

U.S. Pat. No. 4,754,638 (i.e., Brayman et al.) discloses one of the conventional leak testing methods. This conventional method discloses that the test chamber is evacuated and purged with the air or nitrogen gas at the atmospheric pressure or so. However, we find it very difficult to effectively remove the residual tracer gas by merely purging the test chamber at the atmospheric pressure or so. In order to obtain an accurate leak testing result, the probe gas component remained in the testing container should be perfectly removed or reduced to an extremely low level. For this reason, the purging process must be carried out at a predetermined low pressure. The reasons will be described below.

(2) Reason why He gas is employed as the probe gas

In general, as the atomic mass of the probe gas used in the mass-separation-type detector becomes lower, the amount of the noises to be occurred becomes less. Because, there is a tendency in that a polyatomic ion is not easily formed when the atomic mass is small. For this reason, it is advantageous to select $H_2$ gas or He gas as the probe gas. In addition, such probe gas whose atomic mass is small is also advantageous in that the electric configuration of the detector can be made small.

In Europe, $H_2$ gas is frequently used as the probe gas. In some cases, however, the organic solvent is adhered to the testing specimen or testing container. Such organic solvent contains the $H_2$ gas component, which will cause the noises. This organic solvent also interferes with the vacuum evacuation when raising a degree of vacuum.

On the other hand, He gas may be expensive, however, it is easy to obtain the He gas. In addition, He gas has a great safety. Further, only very small amount of He gas exists in the atmosphere at 5 volppm. In other words, He gas hardly exists in the air. Thus, He gas is very unique and is advantageous as being employed as the probe gas.

(3) Feature of the leakage detector

The present invention employs the mass-separation-type detector (which is different from the halogen leak detector) because of its detection precision. Conventionally, this type of detector cannot be operated well if the degree of vacuum is not so high. However, according to a technology advance in these days, this type of detector is improved such that the detecting operation can be carried out in a relatively wide range of pressure which ranges from 40 hPa to 1 hPa, for example. In short, the advanced detector can be operated well even if the degree of vacuum is not so high. A low degree of vacuum can be achieved by a simple vacuum pump within a relatively short period of time.

(4) Detection precision

As described before, in the case where He gas is used as the probe gas, the He gas component existing in the air at 5 volppm may interfere with the detecting operation of the leakage detector when raising the detection precision.

Such He gas remained in the air cannot be removed perfectly by merely blowing $N_2$ gas into the testing container so as to purge it at the atmospheric pressure. Because, we assume that He gas may be easily adhered to the wall of the testing container and He gas cannot be removed at a low degree of vacuum. In order to remove He gas, the testing container must be evacuated at a high degree of vacuum which cannot be made easily.

Thus, we have made further experiments and studies about the reason why He gas is easily remained in the testing container (even in the testing specimen) and is hardly removed. Through these experiments, we reach a conclusion in that He gas is directly adhered on the surface of the testing container (and the surface of the testing specimen) by the chemical bonding such as the ionic bond and covalent bond; or He gas is dissolved into some matters such as the water content or oil adhered on the surface of the testing container or testing specimen, and then, such He gas is gradually emerged after carrying out the gas substitution.

In order to solve the above-mentioned drawback, the substitute gas (i.e., $N_2$ gas) is blown into the testing container under a state where the pressure of the testing container is reduced to a low degree of vacuum. In this case, we find that the remained He gas can be effectively removed, while a remaining level of He gas is very low and is stable. This indicates that the background noise can be reduced and made stable. In other words, the detection precision of the leakage detector can be raised and is not substantially affected by the background noise.

When blowing $N_2$ gas into the testing container under the state where the internal pressure of the testing container is reduced to a low degree of vacuum, $N_2$ gas may be flown through the testing container at a high speed like a jet flow so that some matters adhered on the surface of the testing container or testing specimen can be blown out, in other words, the testing container (or testing specimen) can be effectively cleaned up. When the internal pressure of the testing container is set at 800 hPa, velocity of the gas flow exceeds a velocity of 60 m/s. In order to obtain an intense Jet flow, the internal pressure of the testing container should be set at 500 hPa or below 500 hPa. As the substitute gas, it is possible to employ the nitrogen gas, carbon dioxide gas, oxygen gas, freon gas and the like other than the helium gas which is used as the probe gas.

For example, the internal pressure of the testing container is reduced to a predetermined low degree of vacuum (e.g., 10 hPa), the pressure of which ranges from 500 hPa to 1 hPa. Then, the substitute gas is blown into the testing container. When the internal pressure of the testing container is raised up to 50 hPa or so, for example, by carrying out the gas substitution, the blowing operation of the substitute gas is stopped, thus, a purging operation is completed.

FIG. 10 shows an experimental result indicating a relationship between the pressure and the number of times by which the purging operation is carried out in order to obtain a highly-cleaned state of the testing container so that a satisfactory detection precision (in a level of 0.1 to 1 volppm) can be obtained. As shown in FIG. 10, when the internal pressure of the testing container is reduced to 1 hPa, the purging operation should be carried out two times in order to obtain a satisfactory detection precision. When the internal pressure is reduced to 500 hPa, the purging operation should be carried out three times. However, when the internal pressure of the testing container is increased more than 500 hPa, the number of times by which the purging operation should be carried out is sharply raised up. On the other hand, even when the internal pressure is further reduced less than 1 hPa, the number of times by which the purging operation should be carried out is hardly changed. Further, the repetition per second may be unnecessary in this pressure range, and such degree of vacuum cannot be obtained easily. In short, this experimental result indicates that a predetermined pressure range, i.e., 500 hPa to 1 hPa, is practical when reducing the internal pressure of the testing container before carrying out the purging operation.

The above experimental results are obtained when using a mass-separation-type leakage detector in the pressure range of 0.01 hPa to 10 hPa. However, in the case of the pressure range of 10 hPa to 800 hPa, a sniffer-cell-type leakage detector is useful because the mass-separation-type leakage detector is hard to perform a detecting operation in such pressure range. The cell of the sniffer-cell-type leakage detector has an organic compound membrane made of materials such as the polyethylene, polyamide and polytetrafluoroethylene. This membrane provided in the cell functions to separate gas masses and also raise a partial pressure of He gas. Due to the provision of the membrane, it is possible to detect the density of He gas even in the above pressure range.

(5) Procedure to detect the gas leakage

Next, a procedure to detect the gas leakage will be described in detail by referring to FIG. 11.

Figure 11:
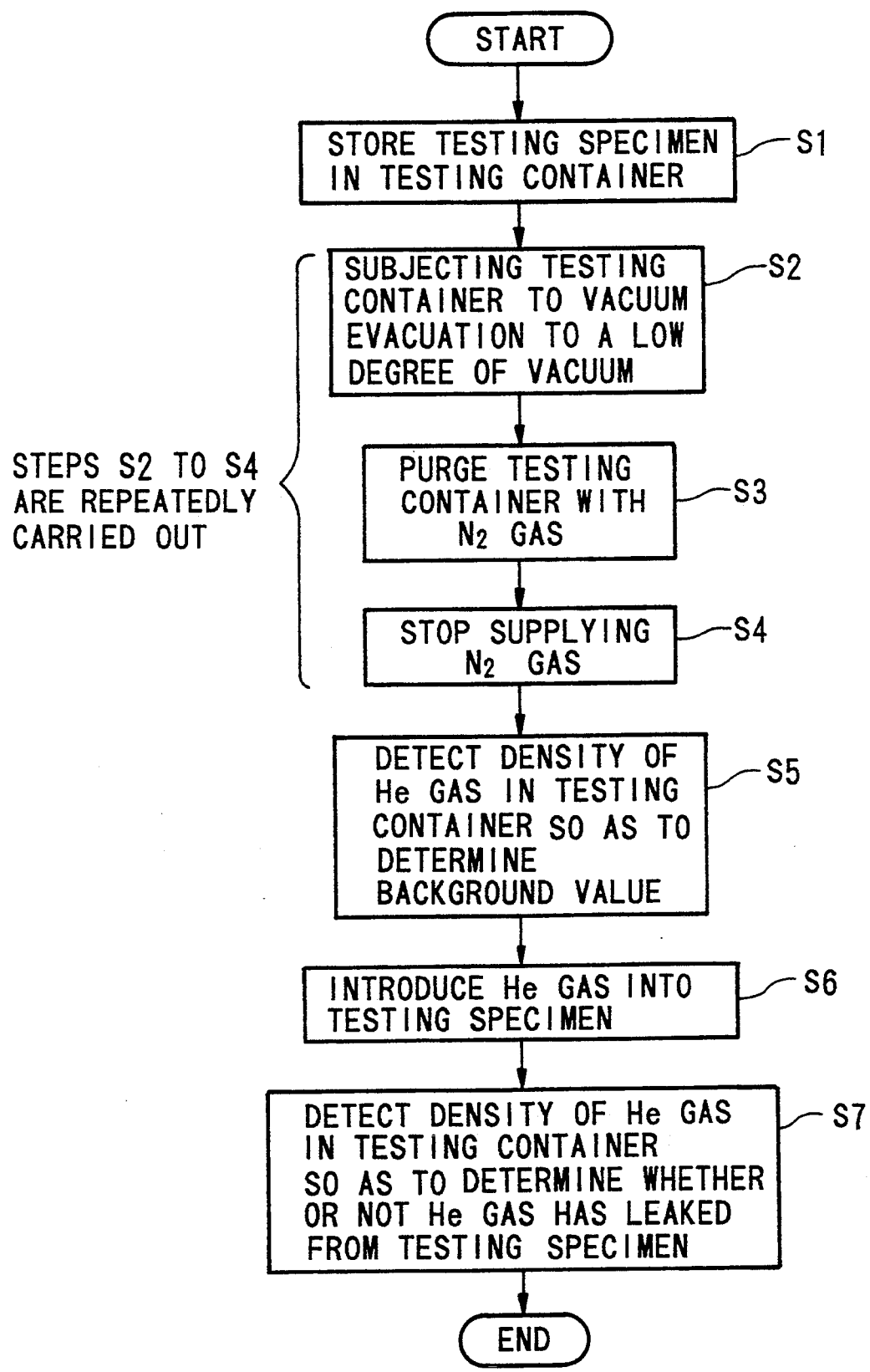
FIG. 11 is a flowchart showing a procedure for performing a gas leakage testing method according to the present invention.

In first step S1 in FIG. 11, the testing specimen is stored in the testing container. In step S2, the testing container is subjected to vacuum evacuation. When the internal pressure of the testing container reaches a predetermined low pressure ranging from 500 hPa to 1 hPa (or 10 hPa), $N_2$ gas is blown into the testing container so as to purge the testing container. Then, when the internal pressure of the testing container is increased to a predetermined pressure (e.g., 50 hPa) by the blowing operation of $N_2$ gas, or when a predetermined period of time (e.g., three seconds) is passed after supplying $N_2$ gas, the supply of $N_2$ gas is stopped. The above-mentioned processes of steps S2 to S4 are repeatedly carried out by a predetermined number of times which is determined by the experimental results as shown in FIG. 10. Thus, the testing container can be cleaned up to a satisfactory level. Thereafter, the density of the probe gas (i.e., He gas) existing in the testing container is detected so as to determine a background value in step S5. In next step S6, He gas is introduced into the testing specimen as the probe gas. In step S7, the density of the probe gas existing in the testing container is detected again so as to determine whether or not the probe gas has leaked from the testing specimen on the basis of the background value. If the current density of the probe gas existing in the testing container is larger than the background value, it is detected that any leakage points must exist in the testing specimen.

Lastly, this invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. A method of testing gas leakage comprising the steps of:
    storing a testing specimen in an air filled testing container;
    evacuating the testing container of air to a predetermined low pressure, and then, purging said testing container with a substitute gas which does not contain helium, wherein an evacuating process and a purging process are repeatedly carried out a predetermined number of times, said predetermined number of times depending on said predetermined low pressure;
    thereafter, detecting density of the helium gas in said testing container so as to obtain a background value representing a background noise for a detection of gas leakage;
    introducing the helium gas into said testing specimen; and
    detecting density of the helium gas in said testing container so as to determine whether or not the helium gas has leaked from said testing specimen on the basis of said background value.

2. A method of testing gas leakage as defined in claim 1 wherein said substitute gas is nitrogen gas.

3. A method of testing gas leakage as defined in claim 1 wherein said predetermined low pressure is below atmospheric pressure and within a pressure range from 500 hPa to 1 hPa.

4. A method of testing gas leakage as defined in claim 1 wherein said purging process is stopped when the internal pressure of said testing container reaches a predetermined pressure which is higher than said predetermined low pressure.

5. A method of testing gas leakage as defined in claim 1 wherein said purging process is stopped when a predetermined period of time has passed.

* * * * *